(12) United States Patent
Cooper et al.

(10) Patent No.: US 6,509,892 B1
(45) Date of Patent: Jan. 21, 2003

(54) METHOD, SYSTEM AND PROGRAM FOR TOPOGRAPHICAL INTERFACING

(75) Inventors: Michael Cooper, Austin, TX (US); Robert Kamper, Round Rock, TX (US); Michael Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,437

(22) Filed: Dec. 17, 1999

(51) Int. Cl.7 ................................................. G09G 5/00
(52) U.S. Cl. ........................ 345/173; 345/701; 345/702
(58) Field of Search ................................. 345/173–178, 345/701, 702; 178/18.01, 18.03–18.09; 341/21, 27

(56) References Cited

U.S. PATENT DOCUMENTS

| | | | | |
|---|---|---|---|---|
| 5,127,050 A | * | 6/1992 | Takahashi et al. | |
| 5,977,867 A | * | 11/1999 | Blouin | 345/173 |
| 6,067,081 A | * | 5/2000 | Hahlganss et al. | 345/173 |
| 6,118,435 A | * | 9/2000 | Fujita et al. | 345/173 |
| 6,243,080 B1 | * | 6/2001 | Molne | 345/173 |

* cited by examiner

Primary Examiner—Regina Liang
(74) Attorney, Agent, or Firm—Marilyn Smith Dawkins; Bracewell & Patterson, L.L.P.

(57) ABSTRACT

A control surface is enabled that is flexible to provide a tactile-detectable graphical representation of graphical output from a data processing system. Application of external force to the control surface is detected. Closed-loop force feedback through the tactile-detectable graphical representation is controlled, in response to detection of external force applied to the control surface. In addition, adjustment of a view element is detected. The magnification of the graphical output that is represented by the tactile-detectable graphical representation is controlled, in response to detection of adjustment of the view control element.

20 Claims, 10 Drawing Sheets

METHOD, SYSTEM AND PROGRAM FOR TOPOGRAPHICAL INTERFACING

BACKGROUND OF THE INVENTION

1. Technical Field

The present invention relates in general to interface devices, and in particular to an improved topographical interface device for a data processing system. Still more particularly, the present invention relates to a method, system and program for providing a tactile-detectable graphical representation of a graphical output from a data processing system, wherein force feedback is achievable.

2. Description of the Prior Art

Data processing systems typically rely on at least one if not multiple independent peripheral devices in order to receive inputs and/or transmit outputs to provide human-computer interactions. In general, data processing systems rely on a pointing device and a data entry device for receiving inputs and a display device for outputting data in a visual manner.

Presently, typical display devices include, for example, a display monitor, an overhead projection monitor, or other alternate device by which data may be displayed in a visual manner from a data processing system. These display devices may be utilized to convey a wide range of information, however are typically limited to two-dimensional display. While graphical achievements have been made in order to display a virtual three-dimensional object, the three-dimensional world is still limited to two-dimensional visual representation with typical display devices.

Developed in parallel with display devices, typical data entry devices include, for example, a keyboard, a keypad, or other alternate device through which data in the form of control indicia or other symbol may be input. Data entry devices, such as the keyboard are limited in that they receive input in relation to fixed control indicia. There are a fixed number of keys, with a majority of the keys having fixed indicia. More recently developed, a vocal recognition device may be utilized in lieu of a keyboard, however because of privacy and environmental noise considerations, there are limitations on the usability of vocal recognition devices.

Developed to supplement data entry devices, pointing devices that have been developed include, for example, a mouse, a trackball, a trackpoint, a touchpad, a pressure sensitive tablet, a stylus, a joy stick or other alternate device through which the location of an on-screen cursor or pointer is controllable. Pointing devices are typically divided into two types of interface devices which utilise different sensing modes and different mappings to allow a user to interact with and manipulate a computer environment: isotonic sensing devices and isometric sensing devices. Isotonic sensing utilizes motion of a physical user object in physical space in predefined degrees of freedom to provide input to the computer. For example, a mouse is an isotonic controller often utilized to control a cursor in a graphical user interface. In contrast, isometric sensing utilizes a user's force or pressure on the object rather than the movement of the user object through physical space. The magnitude and direction of the force that the user exerts on the interface device is sensed and input to the computer to be used in the manipulation and interaction of the computer environment. For example, a "Space Ball" for Space-Tec is a common isometric controller. The Space Ball is a sphere having pressure sensors provided between the ball and the mounting surface. When the user touches the sphere, the sensor detects the direction and magnitude of force exerted by the touch.

Pointing devices, both isotonic and isometric, are limited in that these devices typically only provide visually represented association to a user. In addition, there is a reliance on the hand-eye coordination of the user. Further, most isometric controllers are limited in that they are only input devices and are not able to provide active force feedback to a user. The user is thus not able to experience force feedback when manipulating the isometric controller which can be provided when manipulating an isotonic controller, such as a joystick. The user is therefore missing potentially valuable and interesting force information and assistance in executing tasks in a graphical environment when utilizing a traditional isometric controller.

Additionally, most pointing devices are limited to non-symbolic input whereby the user must switch between pointing devices and data entry devices in order to accomplish tasks. Further, most pointing devices are either isometric or isotonic, therefore the user must switch between the two for different types of input. Constant switching between devices often reduces user efficiency in performing tasks.

Recently, merging multiple peripheral devices into a single, multi-functional interface device has become desirable. For example, in U.S. Pat. No. 5,825,308, a method of merging an isometric sensing device and an isotopic sensing device with force feedback is proposed. A mouse that can be moved in a planar workspace is provided, where a sensor detects the movement of the mouse in physical space and an actuator applies output forces on the mouse. A mode selector is provided to select an isotonic control mode or an isometric control mode of the interface device. In another example, the advent of light pen technology and pressure sensitive displays has merged graphical displays and pointing devices. With both of these technologies, the user interacts directly with the display to control the position of a cursor.

Another area of development in interface devices is in providing tactile-detectable surfaces that convey information to a user. Hyper-braille readers are an example of such an interface device, allowing seeing-impaired users to detect braille letters from a tactile-detectable surface. In U.S. Pat. No. 5,736,978, a tactile graphics display for braille reading is provided. The tactile graphics display combines a Braille character-like display and a planar absolute position sensor. The planar absolute position sensor is distinguished as a type of mouse that only provides for absolute position input to a computer.

Figure 13:
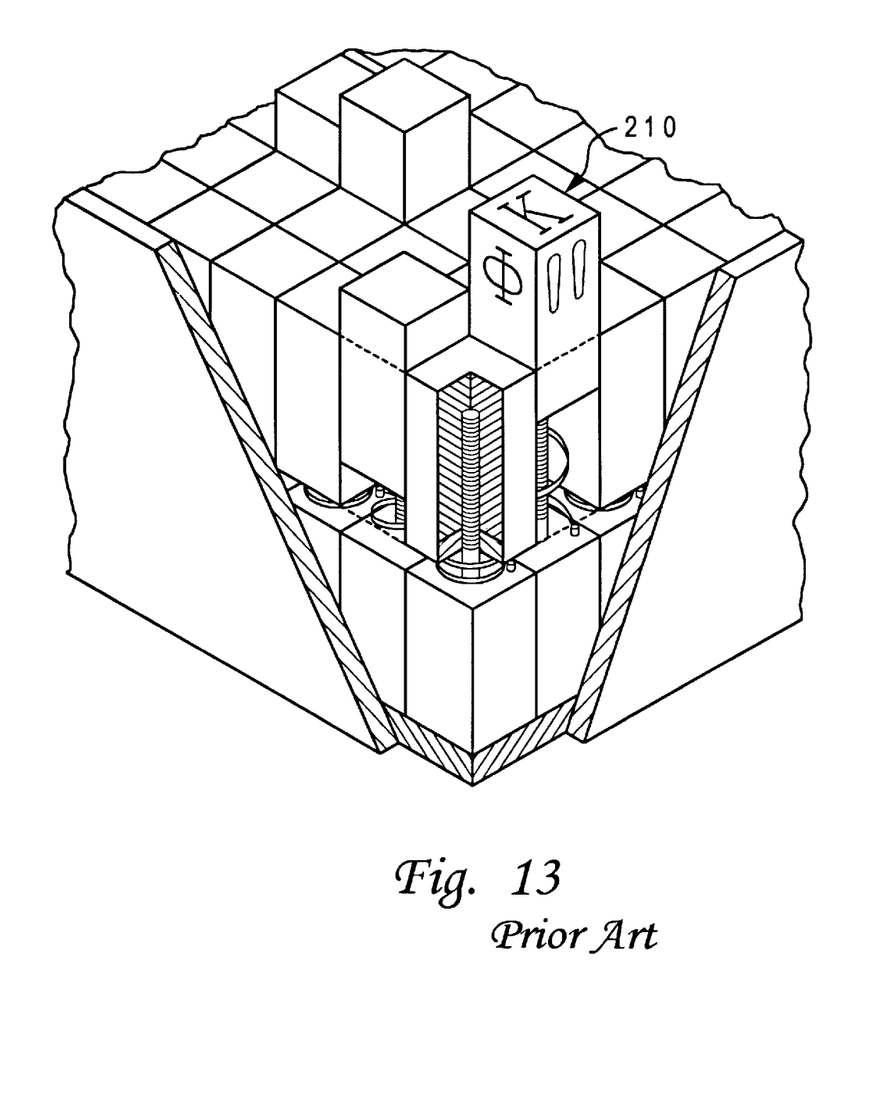
FIG. 13 depicts a prior art block diagram of the three-dimensional display that provides a device for displaying objects both visually and three-dimensionally.

A device that attempts to merge a pointing device and a display device with a tactile-detectable surface is proposed as a three-dimensional display in U.S. Pat. No. 5,717,423. FIG. 13 of the present application depicts a prior art illustration of the three-dimensional display that provides a device for displaying objects both visually and three-dimensionally. Multiple types of display shapes, such as a display shape 210 are controlled by actuators to provide a three-dimensional representation of a display. Visual display devices are included on the display shapes to provide a visual three-dimensional representation of a display. A sensing system detects when a user touches a display shape and responds accordingly. However, the sensing system does not provide for detecting the magnitude of force from user input and responding with force feedback.

In view of the foregoing, it would be preferable to further merge multiple peripheral devices into a single, multi-functional interface device. It would be preferable to provide an interface device that can perform as a pointing device, a data entry device, and a display device that is tactile-detectable and provides closed-loop force feedback. Further, it would be preferable to provide such an interface device that includes a sensing system that detects force, magnitude, and direction of user input. Moreover, it would be preferable that the sensing system detect three-dimensional objects forced thereupon. In addition, it would be preferable to provide such an interface device that provides three-dimensional tactile-detectable display and visual display. Further, it would be preferably that such an interface device utilize a topographical type of display.

SUMMARY OF THE INVENTION

In view of the foregoing, it is therefore one object of the present invention to provide an improved interface device.

It is another object of the present invention to provide an improved topographical interface for a data processing system.

It is yet another object of the present invention to provide a multi-functional topographical interface.

In accordance with a preferred embodiment of the method, system and program of the present invention, a control surface that is flexible is enabled to provide a tactile-detectable graphical representation of graphical output from a data processing system. Application of external force to the control surface is detected. Closed-loop force feedback through the tactile-detectable graphical representation is controlled, in response to detection of external force applied to the control surface. In addition, adjustment of a view element is detected. The magnification of the graphical output that is represented by the tactile-detectable graphical representation is controlled, in response to detection of adjustment of the view control element.

All objects, features, and advantages of the present invention will become apparent in the following detailed written description.

DESCRIPTION OF THE DRAWINGS

The invention itself, as well as a preferred mode of use, further objects, and advantages thereon, will best be understood by reference to the following detailed description of an illustrative embodiment when read in conjunction with the accompanying drawings, wherein.

DESCRIPTION OF A PREFERRED EMBODIMENT

The present invention may be executed in a variety of systems, including a variety of computers under a number of different operating systems. The computer may be, for example, a personal computer, a network computer, a midrange computer or a mainframe computer. In addition, the computer may be a stand-alone system or part of a network such as a local-area network (LAN) or a wide-area network (WAN).

Figure 1:
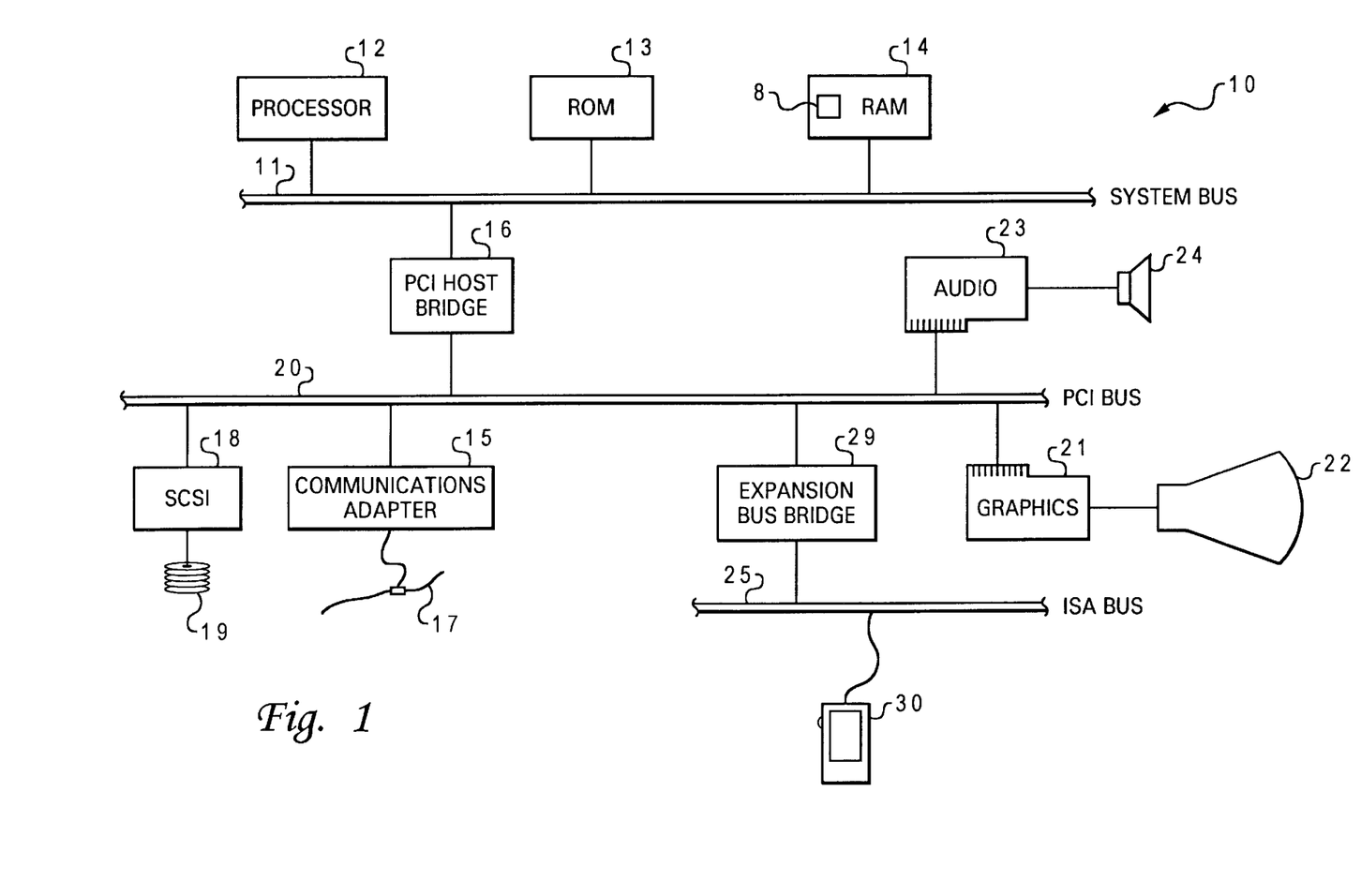
FIG. 1 depicts a block diagram of a typical computer system that may utilize a preferred embodiment of the present invention.

Referring now to the drawings and in particular to FIG. 1, there is depicted a block diagram of a typical computer system that may utilize a preferred embodiment of the present invention. As shown, a processor (CPU) 12, a read-only memory (ROM) 13, and a Random-Access Memory (RAM) 14 are connected to a system bus 11 of a computer system 10. CPU 12, ROM 13, and RAM 14 are also coupled to a PCI local bus 20 of computer system 10 through a PCI host bridge 16. PCI Host Bridge 16 provides a low latency path through which processor 12 may directly access PCI devices mapped anywhere within bus memory and/or I/O address spaces. PCI Host Bridge 16 also provides a high bandwidth path for allowing PCI devices to directly access RAM 14.

Also attaching to PCI local bus 20 are communications adapter 15, small computer system interface (SCSI) 18, and expansion bus bridge 29. Communications adapter 15 is for connecting computer system 10 to a network 17. SCSI 18 is utilized to control high-speed SCSI disk drive 19. Expansion bus bridge 29, such as a PCI-to-ISA bus bridge, may be utilized for coupling ISA bus 25 to PCI local bus 20. As showing a topographical interface system 30 is attached to ISA bus 25 for performing certain basic I/O functions. In addition, an audio adapter 23 is attached to PCI local bus 20 for controlling audio output through speaker 24. In alternate embodiments of the present invention, additional peripheral components may be added.

Computer system 10 also preferably includes an interface such as a graphical user interface (GUI) and an operating system (OS) that reside within machine readable media to direct the operation of computer system 10. Any suitable machine-readable media may retain the GUI and OS, such as RAM 14, ROM 13, SCSI disk drive 19, and other disk and/or tape drive (e.g. magnetic diskette, magnetic tape, CD-ROM, optical disk, or other suitable storage media). Any suitable GUI and OS may direct CPU 12. For example, the AIX operating system is one of IBM's operating systems, which may be implemented.

Further, computer system 10 preferably includes at least one software application (e.g. program product) that resides within machine readable media, for example a topographical control application 8 within RAM 14. A software application contains instructions that when executed on CPU 12 carry out the operations depicted in the flow chart of FIGS. 7–11 and others described herein.

Figure 2:
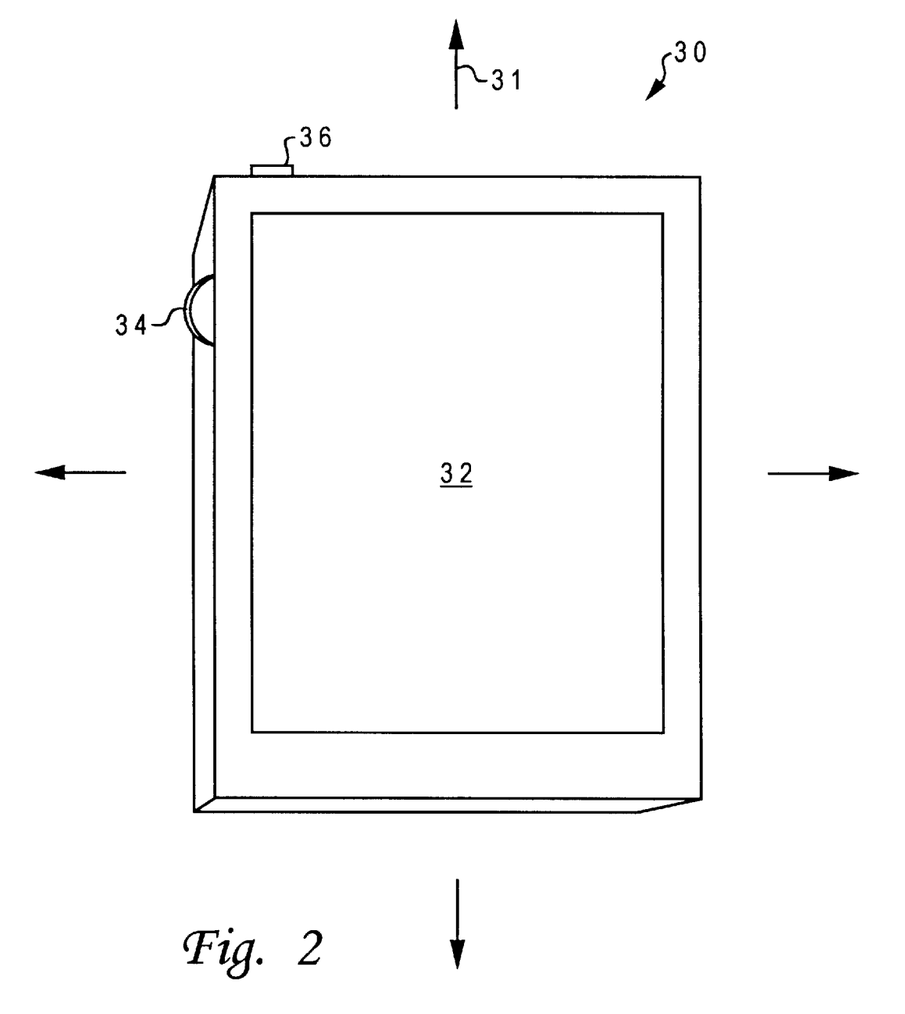
FIG. 2 illustrates a pictorial diagram of a topographical interface in accordance with a preferred embodiment of the method and system of the present invention.

Referring now to FIG. 2, there is illustrated a pictorial diagram of a topographical interface in accordance with a preferred embodiment of the method and system of the present invention. As depicted, a topographical interface system 30 comprises a topographical interface 32 and a zoom wheel 34. Preferably, topographical interface system 30 is enabled to perform the functions of multiple types of interface devices. While one embodiment for housing topographical interface system 30 is depicted, it will be understood that multiple types of housing for topographical interface system 30 may be utilized.

As will be further described, topographical interface 32 is preferably adjustable to provide a tactile-detectable graphical representation of graphical display output from a data processing system. Further, a display surface is preferably embedded within the topographical interface that provides a visual graphical representation of graphical display output. In addition, as will be further described, a sensing system preferably detects the magnitude and direction of any force applied to topographical interface 32 and responds through closed-loop force feedback when applicable. Multiple types of sensing systems may be utilized. For example, a sensing system may be included as an additional capacitive layer of topographical interface 32. In another example, the supportive mechanisms that apply pressure to topographical interface 32 may include sensing elements.

In addition, the precision of the sensing system may vary. For example, the sensing system may be able to discern, with precision, the texture of an object, such as a fingerprint. Moreover, other the sensing system of the present invention may be utilized for other types of biometric measurement. Alternatively, the sensing system may discern magnitude and direction of force without discerning the object applying the force. Furthermore, topographical interface system 30 may be utilized in conjunction with a conventional graphical display or independent of a conventional graphical display. When utilized with a conventional graphical display, topographical interface 32 may include all or part of the elements depicted in the conventional graphical display.

As depicted in FIG. 2, zoom wheel 34 is preferably a tactile-controllable input that controls the view magnification of the graphical display output. For example, rotating zoom wheel 34 in a clockwise direction increases the view magnification of the graphical display output and rotating zoom wheel 34 in a counter clockwise direction decreases the view magnification of the graphical display output. As will be understood by one known in the art, the sizes, shapes and placement of topographical interface 32 and zoom wheel 34 within topographical interface system 30 are arbitrary. In addition, as will be understood, devices other than zoom wheel 34 may be utilized to control view magnification. In addition, zoom wheel 34 or an alternate tactile-controllable device may be utilized to control a scrolling function whereby a user may control the position of a scrollable window.

Topographical interface system 30 further comprises a connection element 36 for input/output. Connection element 36 may include a physical connector to a socket of a data processing system, or may provide for wireless I/O with a data processing system. Further, topographical interface system 30 may include the basic units of a data processing system such that connection element 36 is an internal connection and topographical interface system 30 may function as a fully functional data processing system, instead of functioning as a peripheral to a data processing system. Moreover, additional input/output (I/O) devices may be utilized by topographical interface system 30 including, but not limited to, audio I/O devices, stylus I/O devices, and hyper-braille devices.

In addition, as indicated by movement lines 31, topographical interface system 30 preferably functions with multiple degrees of freedom like a typical mouse or other pointing device wherein movement is detectable. Preferably, as a user moves the position of topographical interface system 30, the portion of a graphical display that is represented on topographical interface 32 is altered. In combination with the zoom wheel, the user may focus the position of topographical interface system 30 at a particular portion of a graphical display and either zoom in or out of that portion of the display to adjust the magnification.

Figure 3:
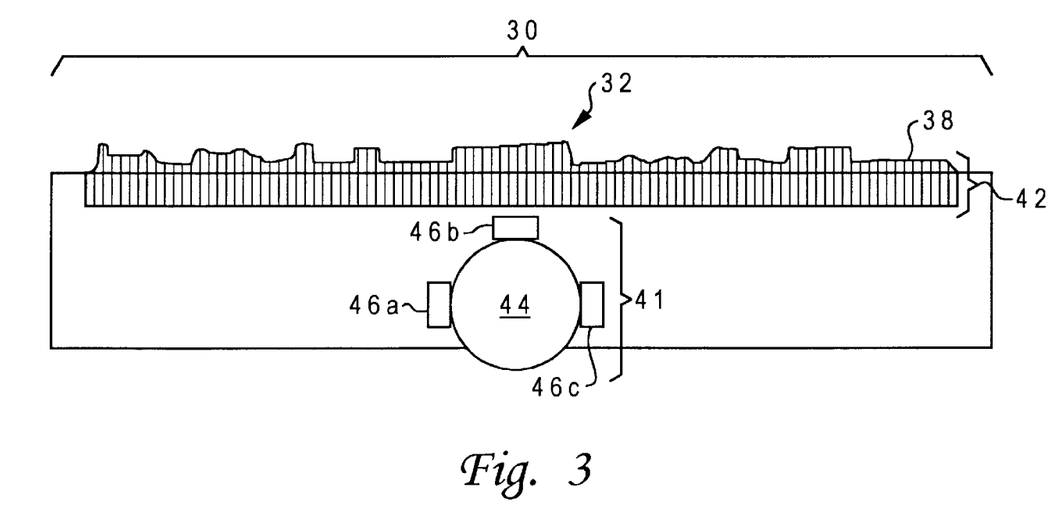
FIG. 3 depicts a side-view of a topographical interface in accordance with a preferred embodiment of the method and system of the present invention.

With reference now to FIG. 3, there is depicted a sideview of a topographical interface in accordance with a preferred embodiment of the method and system of the present invention. Topographical interface 32 is preferably composed of a flexible material 38, such as latex, however in alternate embodiments may consist of multiple sections of flexible material or other alterable surface. In addition, a display surface is preferably embedded within flexible material 38 in a single section or multiple sections. The display surface may comprise any of multiple types of graphical display devices. Moreover, although not depicted, flexible material 38 may be further embedded with a capacitive layer that senses the magnitude and direction of any force applied thereto. Alternatively, a sensing system may be incorporated with supportive mechanisms 42.

Supportive mechanisms 42 preferably include multiple elements beneath the surface of flexible material 38 that are able to adjust the tactile-detectable image produced by flexible material 38. The elements may be solid, such as a screw or a pin with adjustable positions. Alternatively, the multiple elements may include fluid such as air or a liquid that are controlled to apply pressure to flexible material 38. In addition, as will be understood by one known in the art, alternative types of elements may be utilized to achieve a tactile-detectable graphical representation with flexible material 38 or another tactile detectable surface.

Supportive mechanisms 42 are preferably supported by multiple actuators (not shown) where the actuators can act upon supportive mechanisms 42 to adjust the tactile-detectable image produced by flexible material 38. Preferably the actuators adjust both the position and resistance of supportive mechanisms 42. Thereby, while the elements applying force to flexible material 38 form the tactile-detectable graphical representation, the actuators govern the tactile-detectable graphical representation presented by the invention.

In the embodiment depicted, a movement element 41 of topographical interface system 30 comprises a ball 44 that rotates along movement sensors 46a–46c, as is well known in the art. In response to movement of topographical interface system 30 along a surface, the relative movement of ball 44 is detected and may be utilized to control the position of a graphical pointing device indicator on a graphical display other than topographical interface system 30. In addition, in the present invention, the movement of ball 44 may control the portion of a graphical display that is rendered on topographical interface 32. Further, while one embodiment of a movement tracking device is depicted, other types of movement tracking devices may be utilized. For example, in lieu of a ball 44, a sensor that detects the distance and direction of a movement of topographical interface system 30 across a surface may be utilized.

Figure 4:
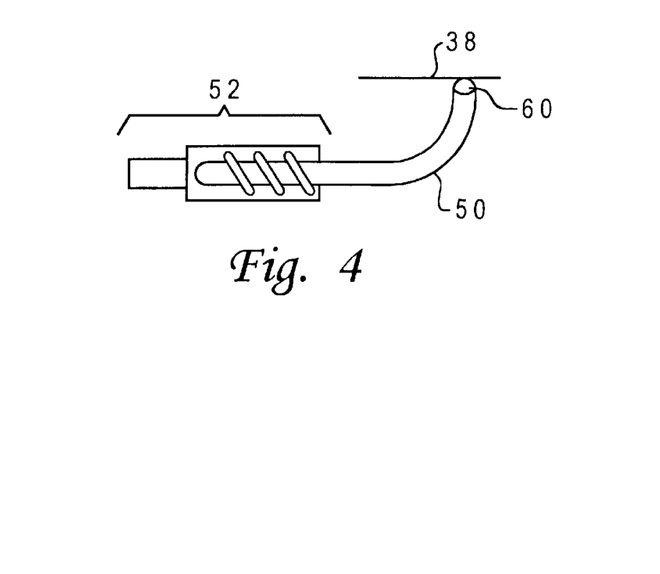
FIG. 4 illustrates a schematic illustration of a driver mechanism that may be utilized as a supportive mechanism for the topographical interface in accordance with the method and system of the present invention.

Referring now to FIG. 4, there is illustrated a schematic illustration of a driver mechanism that may be utilized as a supportive mechanism for the topographical interface in accordance with the method and system of the present invention. As illustrated, flexible material 38 is adjusted by the position of a screw flange 50. An actuator 52 rotates screw flange 50 to control the internal force that screw flange 50 places on flexible material 38. In addition, actuator 52 controls the resistance of screw flange 50 such that if external pressure is applied, the position of screw flange 50 may be adjusted with a particular resistance. A controller provides control signals to actuator 52 that designate the desired position and resistance of screw flange 50. When utilized in the present embodiment, multiple sets of screw flange 50 and actuator 52 are provided to control the pressure placed on flexible material 38 in multiple positions of flexible material 38. In addition, alternate embodiments of screw flange 50 may be utilized. For example, screw flange 50 may have a tip that is triangle, or circular in shape. Further, actuator 52 is preferably enabled to cause tactile-detectable vibration of screw flange 50.

In addition, a touch sensitive element 60 may be utilized with each screw flange 50 to detect magnitude and direction of any external force applied thereto. In the present example, touch sensitive element is placed at the tip of screw flange 50 such that any external pressure applied to flexible material 38 is detected by touch sensitive element 60 and may be compared with the internal pressure applied thereto. Multiple types of touch sensitive elements are available and may be utilized. In addition, multiple touch sensitive elements may be positioned in multiple locations for each screw flange 50, depending upon the configuration of the embodiment. Moreover, in lieu of touch sensitive element 60, pressure on screw flange 50 may cause rotation of screw flange 50 which may be sensed and utilized to determine the magnitude and direction of the force.

Figure 5:
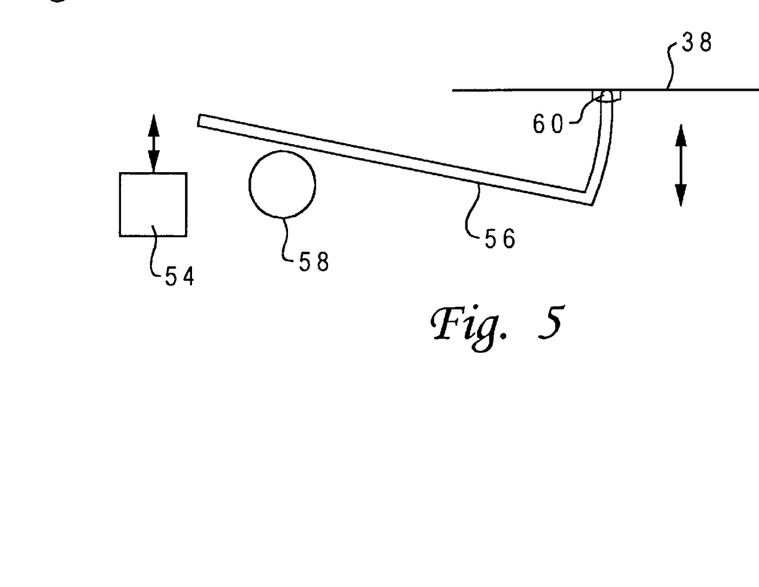
FIG. 5 depicts a schematic illustration of a lever pin that may be utilized for raising and lowering the topographical interface in accordance with the method and system of the present invention.

With reference now to FIG. 5, there is depicted a schematic illustration of a lever pin that may be utilized for raising and lowering the topographical interface in accordance with the method and system of the present invention. As depicted, flexible material 38 is adjusted by the position of a lever 56 along a bearing 56. An actuator 54 raises and lowers the left end of lever 56 whereby the position of the right end of lever 56 is adjusted. When utilized in the present embodiment, multiple sets of lever 56 and actuator 54 are provided to control the pressure placed on flexible material 38. In addition alternate shapes of lever 56 may be utilized. For example, lever 56 may have a tip that is triangle, square, or circular in shape. In addition, a combination of screw flange 50, lever 56 and other supporting mechanisms that are adjustable to apply tactile-detectable pressure to flexible material 38 may be utilized For example, a supporting mechanism may be utilized whereby actuation of fluids controls the pressure applied by the supporting mechanism to flexible material 38. In addition, as depicted with screw flange 50, a touch sensitive element may be utilized.

Figure 6:
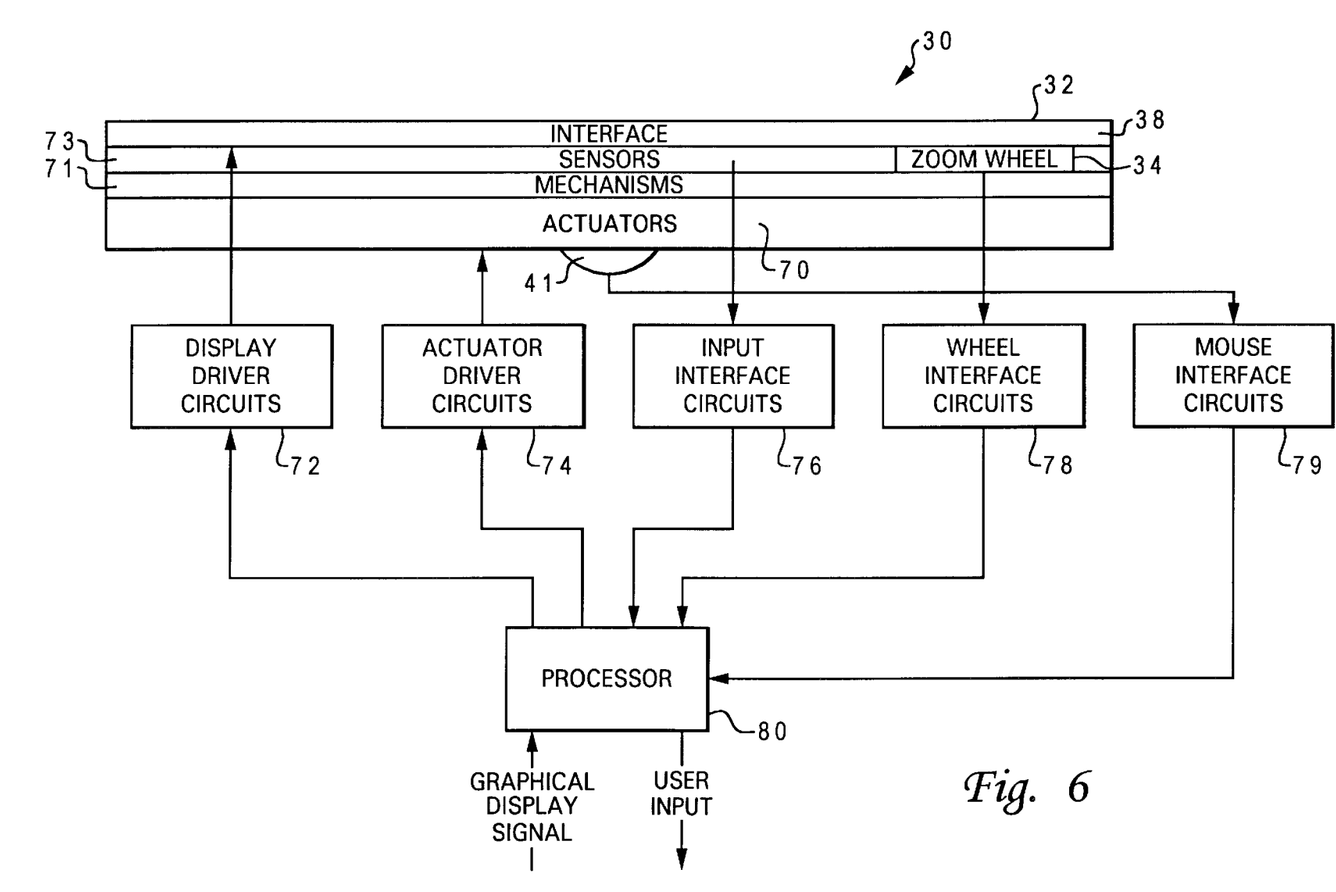
FIG. 6 illustrates a partially schematic block diagram of a controller for a topographical interface system in accordance with the method and system of the present invention.

Referring now to FIG. 6, there is illustrated a partially schematic block diagram of a controller for a topographical interface system in accordance with the method and system of the present invention. As previously depicted, topographical interface system 30 comprises a topographical interface 32 that includes a flexible material 38 with a display surface embedded therein. Zoom wheel 34 is provided for a user to control the view magnification of the display. In addition, as previously discussed, zoom wheel 34 or an alternate tactile-adjustable device may control scrolling. A mouse element 41 is provided for the user to control the portion of the graphical display that is rendered on topographical interface 32 by physically moving topographical interface system 30.

A processor 80 is preferably provided within topographical interface system 30. Processor 80 preferably interfaces with display driver circuits 72, actuator driver circuits 74, input interface circuits 76, wheel interface circuits 78 and mouse interface circuits 79. While not depicted, additional buses and devices, such as RAM and ROM may be included with processor 80. In addition, while not depicted, additional I/O devices may be included which are controllable by processor 80.

A graphical display signal is preferably received at processor 80. The graphical display signal may include information describing a visual graphical display and a tactile-detectable graphical display. In describing the tactile-detectable graphical display, information describing the texture and resistance may be included. Processor 80 receives the graphical display signal from a data processing system and preferably determines and sends signals to display driver circuits 72, which will produce the desired visual graphical representation on display surface 38. The type of circuitry utilized for display driver circuits 72 will be determined by the type of display technology utilized for a particular application, while the complexity of the circuitry will be determined by the size and type of display surface 38. In addition, in response to receiving a graphical display signal, processor 80 determines and sends signals to actuator driver circuits 74, which will drive actuators 70 to move supportive mechanisms 71 to create the desired three-dimensional tactile-detectable imagery with a particular resistance.

User input may come from tactile input in the form of touch, pressure and motion on topographical interface 32, from user adjustment of zoom wheel 34 or from user adjustment of the relative position of topographical interface system 30. Sensors 73 receive user input in the form of touch, pressure, and motion and provide signals to input interface circuits 76. Input interface circuits 76 provides signals to processor 80 that relay user input in the form of the location of user input, the magnitude of force applied, the direction of force applied, and other sensed data. Wheel interface circuits 78 receive signals indicating adjustment of zoom wheel 34, and send signals to processor 80 indicating the adjustment to the position of zoom wheel 34. Mouse interface circuits 79 receive signals indicating adjustment of the position of topographical interface system 30, and send signals to processor 80 indicating the adjustment to the position of topographical interface system 30.

Processor 80 utilizes the input signals provided by interface control circuits 76, wheel control circuits 78, and mouse control circuits 79, to determine a user input signal that is output to a data processing system indicating the multiple types of input entered. Data processing system preferably adjusts the graphical output signal in response to the multiple types of input entered. In addition, processor 80 may determine and send new signals for display driver circuits 72 and actuator driver circuits 74 from the input signals. Preferably, in response to user inputs, processor 80 may determine the amount of force feedback to apply to the signals sent to actuator driver circuits 74 such that the tactile-detectable graphical representation is alterable in response to user input. For example, if a graphical element is displayed that has the texture of a marshmallow, the resistance of the marshmallow adjusts in response to a user pressing the surface, as if pressing the surface of an actual marshmallow. Thereby, the force feedback adjusts the resistance of the supportive mechanisms in order to simulate surfaces with resistance.

Figures 7, 8:
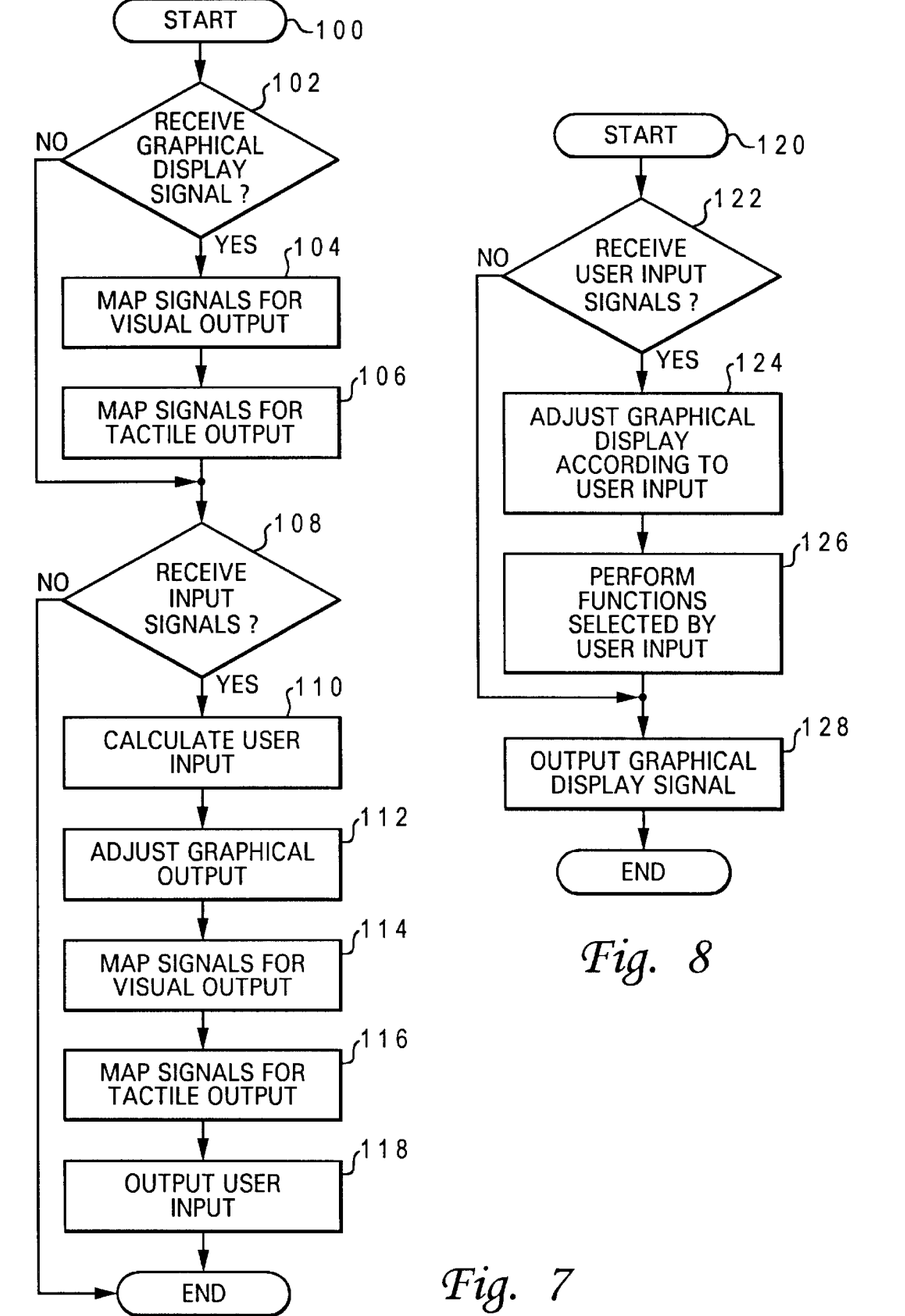
FIG. 7 depicts a high level logic flowchart of a process for controlling inputs and outputs of a topographical interface system in accordance with the method and system of the present invention.
FIG. 8 illustrates a high level logic flowchart of a process for processing inputs and determining outputs to a topographical interface system in accordance with the method and system of the present invention.

With reference now to FIG. 7, there is depicted a high level logic flowchart of a process for controlling inputs and outputs of a topographical interface system in accordance with the method and system of the present invention. As illustrated, the process starts at block 100 and thereafter proceeds to block 102. Block 102 depicts a determination as to whether a graphical display signal is received. If a graphical display signal is not received, the process passes to block 108. If a graphical display signal is received, the process passes to block 104. Block 104 illustrates mapping signals for the visual output. Next, block 106 depicts mapping signals for the tactile output. The signals for tactile output designate which supportive mechanisms to reposition and the amount to reposition the elements. In addition, the amount of resistance applied by each element may be mapped. Thereafter, the process passes to block 108.

Block 108 illustrates a determination as to whether input signals have been received. Input signals may come from input interface circuits, wheel interface circuits and/or mouse interface circuits. If input signals have not been received, the process ends. If input signals have been received, the process passes to block 110. Block 110 depicts calculating user input from the input signals. For example, in calculating user input from input from mouse interface circuits, signals are calculated that indicate how the topographical interface system was moved, as if a typical pointing device. Next, block 112 illustrates adjusting the graphical output. In adjusting the graphical output, the graphical display signal is adjusted according to the input signals received. Preferably, by adjusting the graphical output at the topographical interface system, closed-loop force feedback in response to user input is achievable. Thereafter, block 114 depicts mapping signals for visual output. Block 116 illustrates mapping signals for tactile output. Thereafter, block 118 depicts outputting the user input and the process ends.

Referring now to FIG. 8, there is illustrated a high level logic flowchart of a process for processing inputs and determining outputs to a topographical interface system in accordance with the method and system of the present invention. As depicted, the process starts at block 120 and thereafter proceeds to block 122. Block 122 illustrates a determination as to whether user input signals are received. If user input signals are not received, the process passes to block 128. If user input signals are received, the process passes to block 124. Block 124 depicts adjusting the graphical display according to the user input. For example, user input derived from movement of the topographical interface system is processed by data processing system as if from a pointing device. Next, block 126 illustrates performing functions selected by user input. For example, if the user input indicates that the user has selected a button, the function associated with selecting the button is performed. Thereafter, block 128 depicts outputting the graphical display signal and the process ends.

Figure 9:
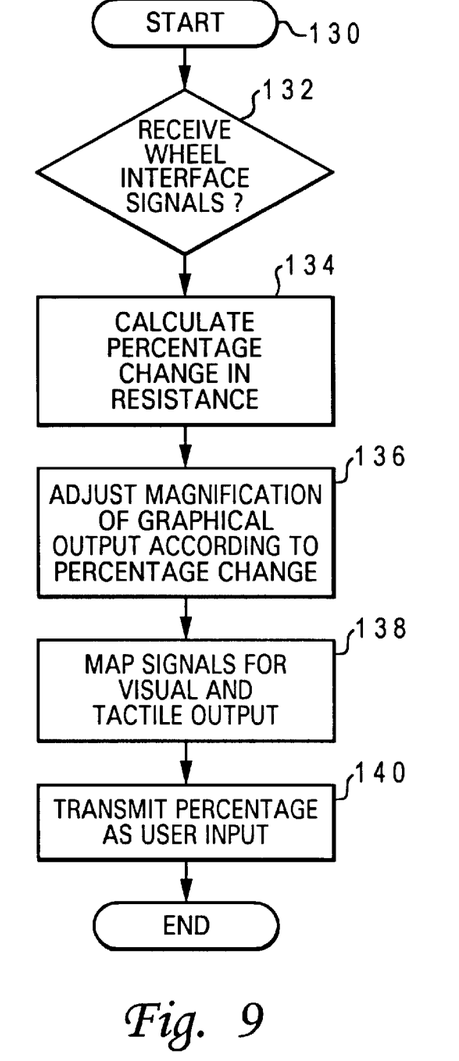
FIG. 9 depicts a high level logic flowchart of a process for calculating user inputs from adjustments to a zoom wheel in accordance with the method and system of the present invention.

With reference now to FIG. 9, there is depicted a high level logic flowchart of a process for calculating user inputs from adjustments to a zoom wheel in accordance with the method and system of the present invention. As illustrated, the process starts at block 130 and thereafter proceeds to block 132. Block 132 depicts a determination as to whether wheel interface signals are received. If wheel interface signals are not received, the process iterates at block 132. If wheel interface signals are received, the process starts at block 134. Block 134 illustrates calculating a percentage change in the resistance of the wheel interface signals. Alternatively, other types of data may be measured and utilized to calculate the percentage change in the position of a zoom wheel. Next, block 136 depicts adjusting the magnification of the graphical output according to the percentage change. Thereafter, block 138 illustrates mapping signals for visual output and mapping signals for tactile output. Next, block 140 depicts transmitting user input signals to a data processing system and the process ends. In the present invention, it is depicted that adjustments to the magnification of the graphical output are calculated at the topographical interface system, however, in alternate embodiments, the adjustment to the magnification of the graphical output may be calculated from the user input to a data processing system.

Figure 10:
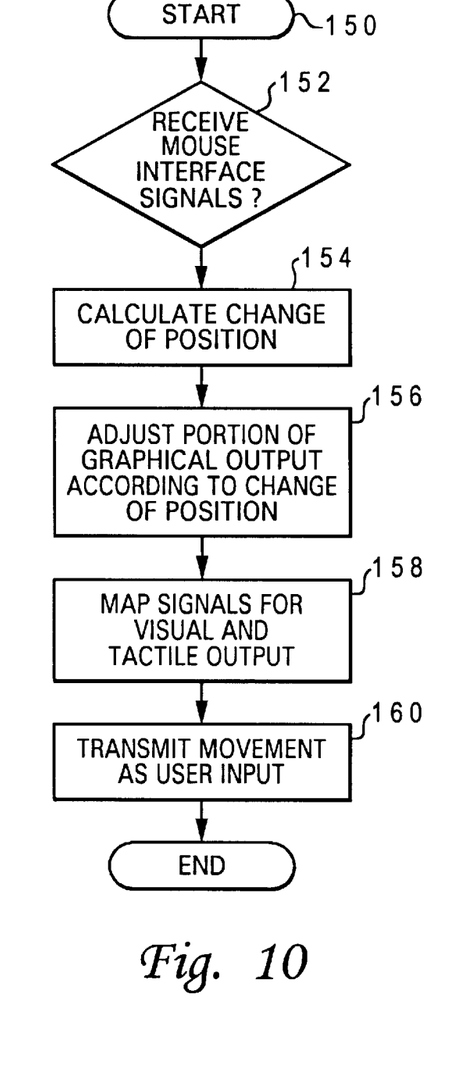
FIG. 10 illustrates a high level logic flowchart of a process for calculating user inputs from adjustments to the position of a topographical interface system in accordance with the method and system of the present invention.

Referring now to FIG. 10, there is illustrated a high level logic flowchart of a process for calculating user inputs from adjustments to the position of a topographical interface system in accordance with the method and system of the present invention. As depicted, the process starts at block 150 and thereafter proceeds to block 152. Block 152 illustrates a determination as to whether mouse interface signals are received. If mouse interface signals are not received, the process iterates at block 152. If mouse interface signals are received, the process passes to block 154. Block 154 depicts calculating the change in position. Next, block 156 illustrates adjusting the portion of the graphical output according to the change in position. Thereafter, block 158 depicts mapping signals for visual output and mapping signals for tactile output. Next, block 160 illustrates transmitting the mouse movement as user input signals to a data processing system and the process ends. In the present invention, it is depicted that adjustments to the portion displayed of the graphical output are calculated at the topographical interface system, however, in alternate embodiments, the adjustment to the portion displayed of the graphical output may be calculated from the user input to a data processing system.

Figure 11:
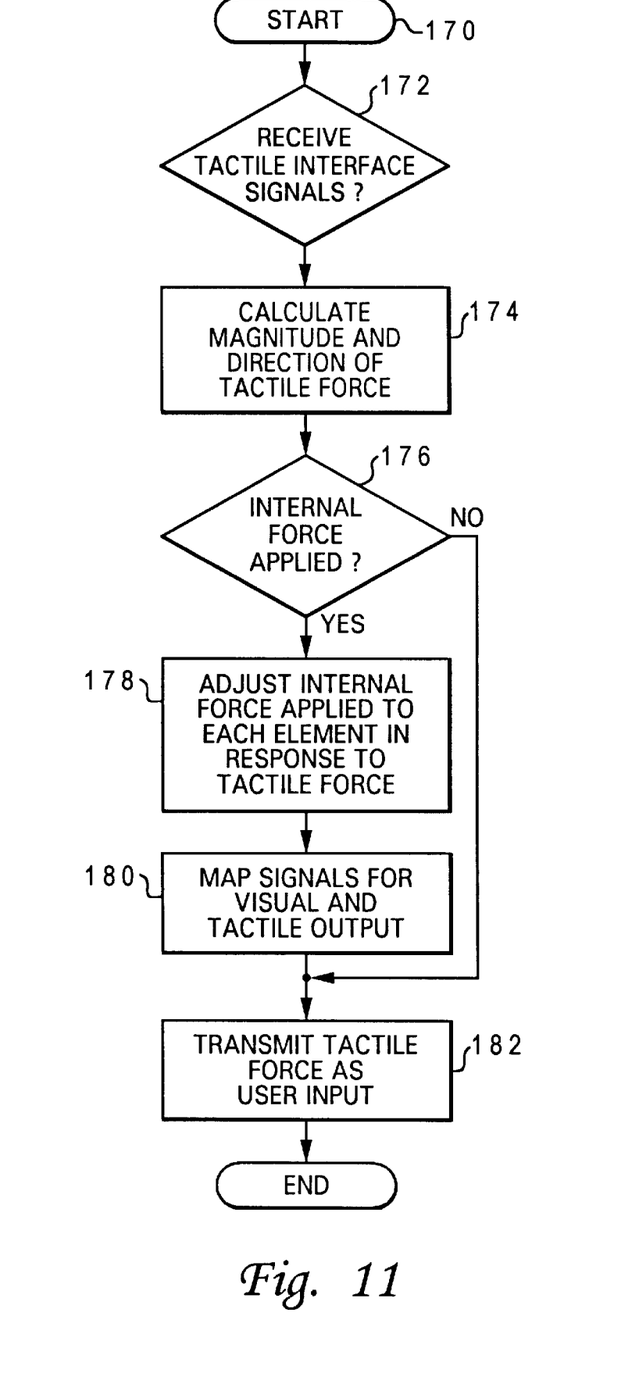
FIG. 11 depicts a high level logic flowchart of a process for calculating user inputs from tactile input to a topographical interface system in accordance with the method and system of the present invention.

With reference now to FIG. 11, there is depicted a high level logic flowchart of a process for calculating user inputs from tactile input to a topographical interface system in accordance with the method and system of the present invention. As illustrated, the process starts at block 170 and thereafter proceeds to block 172. Block 172 depicts a determination as to whether tactile interface signals are received. If tactile interface signals are not received the process iterates at block 172. If tactile interface signals are received, the process passes to block 174. Block 174 illustrates calculating the magnitude and direction of external force applied. Next, block 176 depicts a determination as to whether internal force is applied. Internal force is applied by the supportive mechanisms. If internal force is not applied, the process passes to block 182. If interface force is applied, the process passes to block 178. Block 178 illustrates adjusting the internal force applied to each element in response to the external force. In adjusting the internal force, the resistance and/or position of the tactile supportive mechanisms may be adjusted. The internal force is preferably adjusted such that closed-loop force feedback is achievable. Block 180 depicts mapping the signals for visual and tactile output. Thereafter, block 182 illustrates transmitting the tactile force as user input and the process ends.

With reference now to FIGS. 12a–12f, there is depicted a pictorial illustration of multiple views of a spreadsheet in accordance with the method and system of the present invention. Each of FIGS. 12a–12f includes a topographical interface 190 within which both a three-dimensional tactile detectable graphical display and a three-dimensional visual graphical display. It is to be understood that in touching topographical interface 190 a user may detect the three-dimensional images depicted in each of FIGS. 12a–12f. In addition, it is to be understood that the user may visually detect the three-dimensional images depicted in each of FIGS. 12a–12f. Further, it is to be understood that the three-dimensional images depicted in each of FIGS. 12a–12f are simplified three-dimensional images utilized for purpose of description and are not to limit the types of three-dimensional images which may be rendered.

Figure 12A:
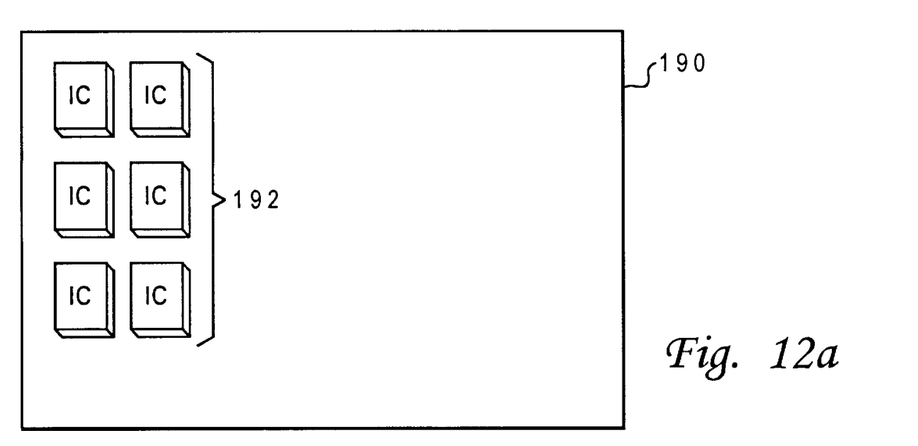
FIGS. 12a–12f illustrates a pictorial illustration of multiple views of a spreadsheet in accordance with the method and system of the present invention.
Figure 12B:
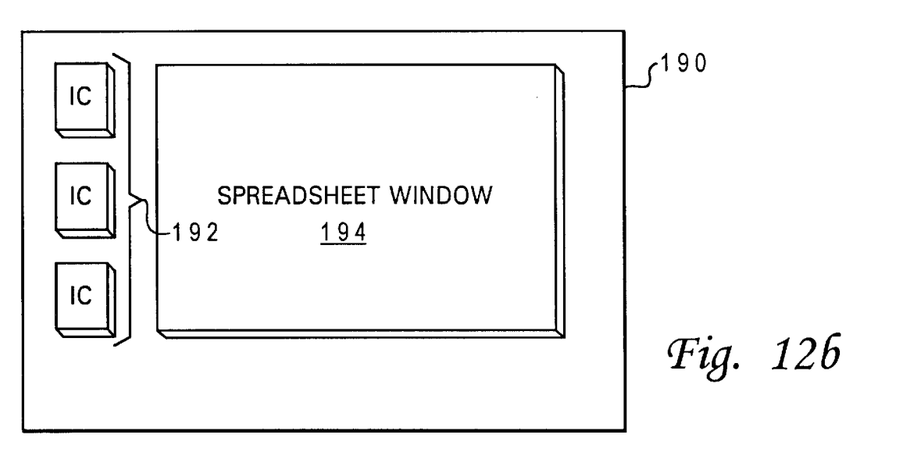
Figure 12C:
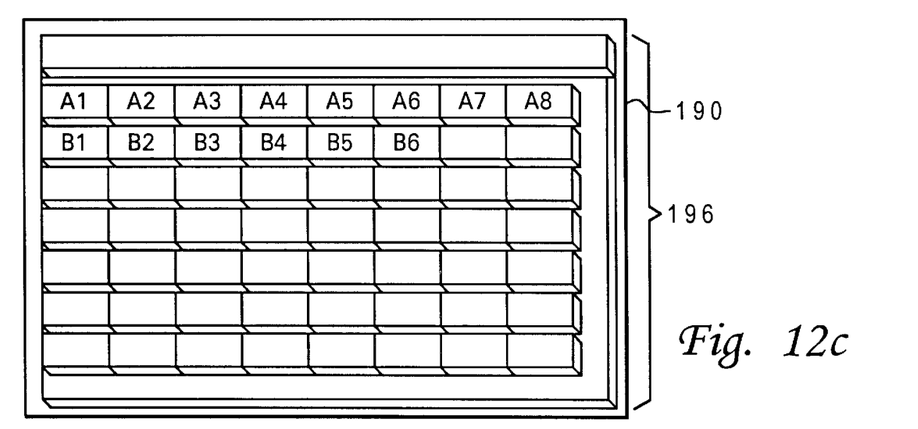
Figure 12D:
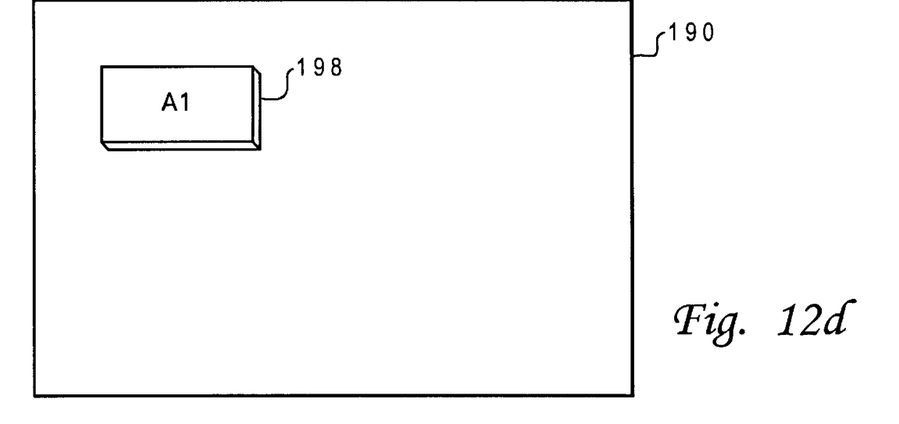
Figure 12E:
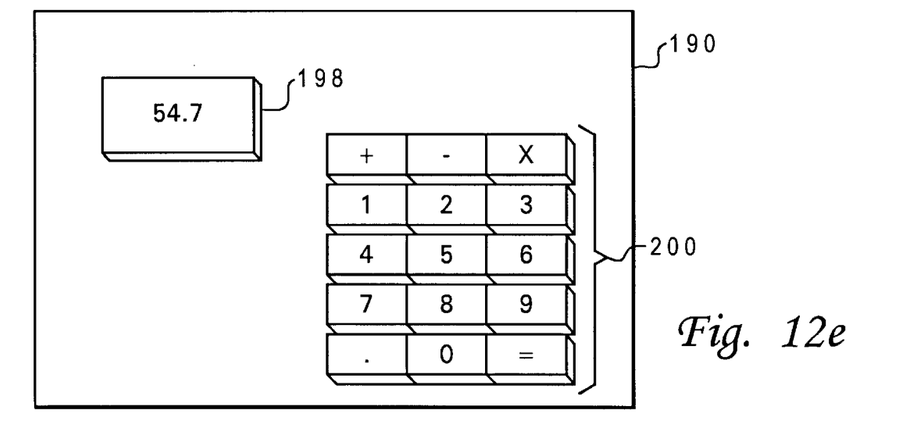
Figure 12F:
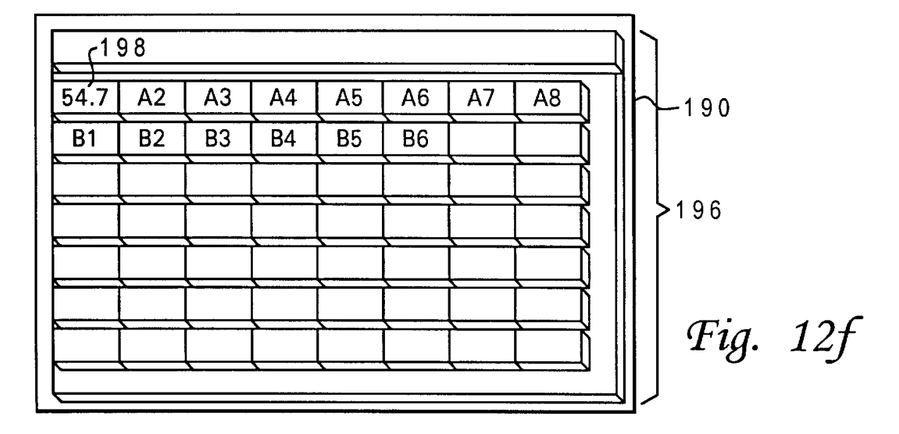

FIG. 12a depicts a desktop with multiple desktop icons (IC) 192. A user may select one of the desktop items, for example, by tactile input, wherein selection of the desktop item activates a spreadsheet application. FIG. 12b illustrates the desktop of FIG. 12a with a spreadsheet window 194 open. In the present example, a user rotates the zoom wheel to increase the magnification of the spreadsheet window. FIG. 9c depicts topographical interface 190 with a magnified spreadsheet 196. Spreadsheet 196 comprises multiple cells that are individually tactile-detectable and visually detectable. In the present example, the user selects cell A1 by tactile input and then rotates the zoom wheel to increase magnification of cell A1. FIG. 9d illustrates a magnified cell A1 by reference numeral 198. FIG. 9e depicts a tactile-detectable keypad 140 that may be utilized by the user for entering numerical data. For example, the user has entered the value "54.7"into the cell designated by reference numeral 198. In particular, user input to keypad 200 is detected by the topographic interface system and preferably is converted into a keystroke signal. In the example, the user next rotates the zoom wheel to decrease the scale and display magnified spreadsheet 196, as depicted in FIG. 12f.

As has been described, the present invention provides an improved method and system for topographical interfacing. In particular, one example of the application of the present invention has been depicted in FIGS. 12a–12f, however alternate applications of the present invention are also suitable. For example, applications of the present invention may include interfaces for use when it would be a safety risk for the user to focus their eyes on a display. In that manner, a topographical interface may be utilized in a car where it is desirable for the user to maintain focus on driving. In addition, in other applications, the topographical interface system may be utilized in conjunction with other peripherals. For example, when utilized in conjunction with an overhead projector, altering the zoom wheel would change the graphical display magnification provides to both the overhead projector and to the topographical interface system.

Therefore, with the topographical interface system of the present invention, a user is provided with an interface that is both isometric and isotonic. Isotonic sensing is provided in that the user can physically move the topographical interface system and visibly see a cursor moving on an alternate graphical display. In addition, in physically moving the topographical interface system, the user can tactilely and visible detect a change in the portion of a graphic output that is tactilely and visually displayed on the topographical interface. Isometric sensing is provided in that the user can apply pressure to the topographical interface and either view the results of the pressure on an alternate graphical display, on the topographical interface or through other output devices. For example, if topographical interface is functioning as a piano keyboard, the magnitude of pressure applied to a particular key would be detectable by the user based on how loudly a note is audibly output.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A topographical interface system, said interface comprising:
   a control surface that is flexible to provide a tactile-detectable graphical representation of graphical output from a data processing system, wherein said control surface includes:
      a flexible material;
      a plurality of mechanisms dispersed about said flexible material; and
      a plurality of actuators controlled by a controller for controlling a position of said plurality of mechanisms to adjust the topography of said flexible material; and
   said controller that controls closed-loop force feedback through said tactile-detectable graphical representation, in response to detection of external force applied to said control surface.

2. The topographical interface system according to claim 1, wherein said interface further comprises;
   a sensitivity element that detects external force applied to said control surface.

3. The topographical interface system according to claim 2, wherein said sensitivity element further comprises:
   a capacitive layer embedded with said control surface.

4. The topographical interface system according to claim 1, wherein said interface further comprises:
   a display surface embedded within said control surface that provides a visual graphical representation of graphical output from said data processing system.

5. The topographical interface system according to claim 1, wherein said plurality of actuators control a resistance of said plurality of mechanisms.

6. The topographical interface system according to claim 1, wherein said plurality of actuators detect external force applied to said plurality of mechanisms.

7. The topographical interface system according to claim 1, wherein said flexible material is vacuum-sealed about said plurality of mechanisms.

8. The topographical interface system according to claim 1, wherein said controller further comprises:
- a processor for interpreting and dispersing data transmitted to said topographical interface system; and
- said processor for converting and controlling the transmission of data from said topographical interface system.

9. The topographical interface system according to claim 8, wherein said processor receives a graphical display signal and maps said graphical display signal to control said tactile-detectable graphical representation on said control surface.

10. The topographical interface system according to claim 9, wherein said processor adjusts mapping of said graphical display signal to control said tactile-detectable graphical representation on said control surface, in response to application of external force.

11. The topographical interface system according to claim 1, wherein said interface further comprises a communication element for transferring data between said data processing system and said topographical interface system.

12. A method for topographical interfacing, said method comprising the steps of:
- enabling a control surface that is flexible to provide a tactile-detectable graphical representation of graphical output from a data processing system;
- detecting application of external force to said control surface; and
- controlling closed-loop force feedback through said tactile-detectable graphical representation, in response to detection of external force applied to said control surface, wherein said step of controlling closed-loop force feedback through said tactile-detectable graphical representation, includes the step of controlling the position of a plurality of mechanisms that adjust said control surface.

13. The method for topographical interfacing according to claim 12, wherein said method further comprises the steps of:
- controlling a display surface embedded within said control surface that provides a visual graphical representation of graphical output from said data processing system.

14. The method for topographical interfacing according to claim 12, wherein said method further comprises the step of:
- controlling the resistance of said plurality of mechanisms.

15. A method for topographical interfacing, said method comprising the steps of:
- enabling a control surface that is flexible to provide a tactile-detectable graphical representation of graphical output from a data processing system;
- detecting application of external force to said control surface; and
- controlling closed-loop force feedback through said tactile-detectable graphical representation, in response to detection of external force applied to said control surface, wherein said step of controlling closed-loop force feedback through said tactile-detectable graphical representation further comprises the steps of:
  - detecting an internal force applied to said control surface;
  - determining a difference between said internal force and said external force; and
  - adjusting said internal force of said graphical output, in response to determining a difference between said internal force and said external force.

16. The method for topographical interfacing according to claim 15, wherein said step of adjusting said internal force of said graphical output, further comprises the step of:
- mapping control signals that control said tactile-detectable graphical representation from said adjusted internal force of said graphical output.

17. A program residing on a computer usable medium having computer readable program code means, said program comprising:
- means for enabling a control surface to provide a tactile-detectable graphical representation of graphical output;
- means for detecting application of external force to said control surface;
- means for controlling closed-loop force feedback through said tactile-detectable graphical representation, in response to detection of external force applied to said control surface; and
- means for controlling the position of a plurality of mechanisms that adjust said control surface.

18. The program according to claim 17, said program further comprising;
- means for enabling a visual graphical representation of graphical output.

19. The program according to claim 17, said program further comprising:
- means for controlling the resistance of said plurality of mechanisms.

20. A program, residing on a computer usable medium having computer readable program code means, said program comprising:
- means for enabling a control surface to provide a tactile-detectable graphical representation of graphical output;
- means for detecting application of external force to said control surface;
- means for controlling closed-loop force feedback through said tactile-detectable graphical representation, in response to detection of external force applied to said control surface;
- means for detecting internal force applied to said control surface;
- means for determining a difference between said internal force and said external force; and
- means for adjusting said internal force of said graphical output, in response to determining a difference between said internal force and said external force.

* * * * *